(12) United States Patent  (10) Patent No.: US 8,418,638 B2
Schramer  (45) Date of Patent: Apr. 16, 2013

(54) COMBINATION PONTOON BOAT AND HOVERCRAFT

(76) Inventor: Richard Schramer, Berlin, WI (US)

( * ) Notice: Subject to any disclaimer, the term of this patent is extended or adjusted under 35 U.S.C. 154(b) by 0 days.

(21) Appl. No.: 13/340,050

(22) Filed: Dec. 29, 2011

(65) Prior Publication Data

US 2012/0171910 A1  Jul. 5, 2012

Related U.S. Application Data

(60) Provisional application No. 61/428,673, filed on Dec. 30, 2010.

(51) Int. Cl.
*B63B 1/38* (2006.01)
(52) U.S. Cl.
USPC ............... 114/67 A; 114/67 R; 440/12.5
(58) Field of Classification Search ........... 114/67 A, 114/67 R; 440/12.5
See application file for complete search history.

(56) References Cited

U.S. PATENT DOCUMENTS

| 3,765,357 A | * | 10/1973 | Peri | 114/67 A |
| 4,067,516 A | * | 1/1978 | Dobb | 244/17.11 |
| 4,660,492 A | * | 4/1987 | Schlichthorst et al. | 114/67 A |
| 7,428,939 B1 | * | 9/2008 | Ducote | 180/116 |
| 7,464,657 B2 | * | 12/2008 | Maloney et al. | 114/67 A |
| 7,497,179 B2 | * | 3/2009 | Dize | 114/61.1 |
| D646,198 S | * | 10/2011 | Desberg | D12/5 |
| 8,206,190 B2 | * | 6/2012 | Lee | 440/12.63 |

* cited by examiner

*Primary Examiner* — Joe Morano, IV
*Assistant Examiner* — Jovon Hayes
(74) *Attorney, Agent, or Firm* — Howard B. Rockman (57) ABSTRACT

A combination floating pontoon boat and air-cushion supported hovercraft having a frame and a plurality of pontoons pivotally and retractably mounted to the frame for pontoon boat mode, and a second position extending laterally outward from the frame in hovercraft mode. A skirt is attached to and extends from the frame, the skirt on a first position being retracted against the bottom of the frame. In a second position, the skirt extends downward from the frame and forms an air-receiving pocket beneath the frame for hovercraft operation. A first power system moves the frame through water when the pontoons are in their first position. A second power system drives air into the air-receiving pocket when the skirt is in the second or hovercraft position, and a third power system propels the frame in a longitudinal direction when air is driven into the air-receiving pocket.

12 Claims, 9 Drawing Sheets

COMBINATION PONTOON BOAT AND HOVERCRAFT

Applicant claims priority of Provisional Application Ser. No. 61/428,673 Filed Dec. 30, 2010 to the extent allowed by law.

BACKGROUND OF THE INVENTION

The "Hovertoon" is a hybrid of a pontoon boat and hovercraft, the function of which allows the operator to traverse over multiple water and land conditions. Most lakes and rivers either have shallow areas or have many sandbars which prevent conventional inboard/outboard water craft from traversing the shallow areas. This invention allows a pontoon boat to be transformed into a hovercraft that can maneuver over these shallow or no water conditions and yet transform back into a pontoon craft for navigable water conditions.

SUMMARY OF THE INVENTION

This invention comprises pontoons that rotate outward from the frame of the craft, while simultaneously deploying an air trapping skirt that extends downward from the frame of the craft. The rotated pontoons increase the surface area of the hovercraft and provide more lift for increased load carrying capacity and more stability with a lower profile. The design incorporates ducted fan propulsion with side inlets for lateral movement of the craft. The lift fans can be of standard squirrel cage design and incorporate front inlets. The side inlet design for the ducted fan propulsion allows for an open pontoon craft layout with a canvas convertible top and standard pontoon furniture components. The power plant, which can consist of a combustion engine, is coupled to a hydraulic pump to operate the lift fans or outdrive unit and forward/reverse transmission which drives the ducted fans. The hydraulic pump powers the lift fans in hovercraft mode and also powers the outdrive unit when in pontoon mode. The forward/reverse transmission powers the ducted fans via a belt drive arrangement. A brake system, which can be electric, stops the ducted fans while shifting from forward to reverse and reverse to forward.

To shift from pontoon mode to hovercraft mode, rotating mechanisms are used to rotate the pontoons. The rotating elements can also be independently controlled to provide for load leveling capabilities. The aforementioned rotating elements are controlled by a hydraulic-powered, electric-powered, or combustion-powered linkage assembly. A skirt retraction and deployment assembly pulls the hovercraft skirt to the underside of the pontoons while in pontoon mode, or for transport on a trailer. The skirt retraction and deployment assembly is controlled by a cable drawn by an electric motor, hydraulic motor, or combustion-powered engine motor.

Lift fan inlets, and the propulsion fan inlets and outlets, are protected with horizontal metal bars to prevent ingestion of foreign matter, and the rudders are also concealed behind the same metal bars for protection. The individual propulsion inlet rudders are used to direct reverse thrust that enables the craft to turn in confined spaces. The manually operable steering wheel provides steerage for both the rudders and the hydraulic outboard. A single forward/reverse/throttle lever controls both the propulsion fan system and the hydraulic outboard.

The craft includes a self-contained cooling system using standard antifreeze that allows the craft to be used in the winter on snow, ice, and open water, making the craft ideally suited for rescue operations. The inside of the craft can be outfitted with a canvas top, clear vinyl sides and interior heaters, providing year round use.

DETAILED DESCRIPTION OF THE DRAWINGS

Figure 1:
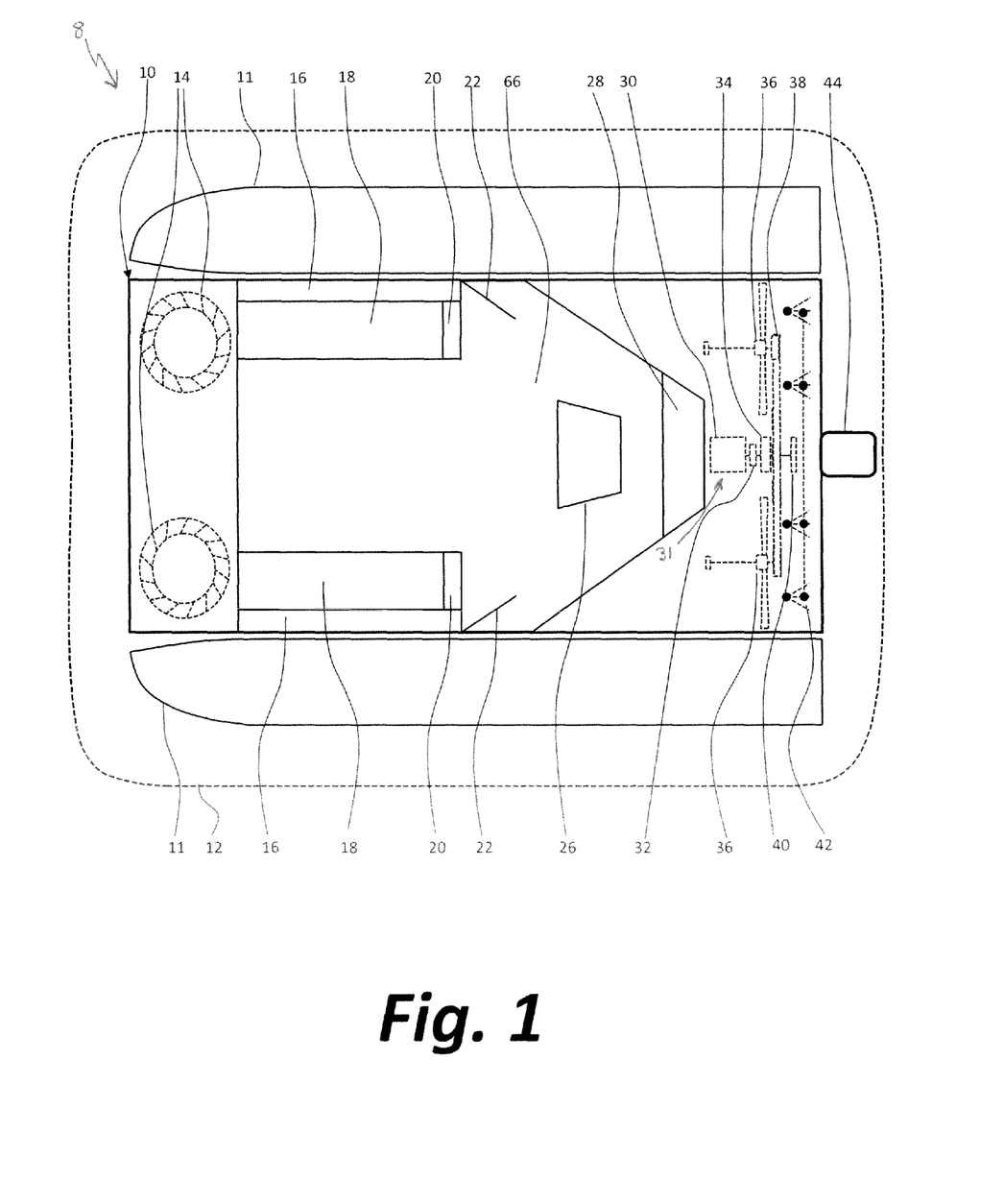
FIG. 1 is a top view of the craft showing the placement of the interior squirrel cage fans used for lift, the location of the motor and drive train, the propulsion ducted fans, hydraulic outboard used in pontoon mode, and the dashed lines showing the deployed pontoons and skirt for use in hovercraft mode.

FIG. 1 is top view of an embodiment of the hovercraft 8. The hovercraft frame 10 supports a skirt 12 of the hovercraft 8 and the other constituent components of the hovercraft 8. The pontoons 11 are pivotally mounted to frame 10 (FIG. 3) and are shown in FIG. 1 in an outwardly deployed hovercraft. The skirt 12 is also illustrated in a deployed skirt position. In this embodiment, lift fans 14 are disposed toward the forward region of frame 10. The lift fans 14 inflate the skirt 12 when the skirt 12 is in the deployed skirt position. A pilot console 26 containing the instrumentation and controls of the hovercraft 8 is located at a point on frame 10 such that the lift fans 14 do not obstruct the vision of the user. A power assembly 31 of the hovercraft 8 includes a motor 30 which is coupled to a hydraulic pump 32 and a forward/reverse transmission 34 which drives the dual propulsion fans 36. The propulsion fans 36 propel the hovercraft 8 by blowing across a rudder assembly 42 that is directly coupled with an outdrive unit 44 allowing one steering mechanism to control both the hovercraft and pontoon boat modes of operation. A brake 40 is provided that stops the propulsion fans 36 when transitioning from forward to reverse and from reverse to forward.

Figure 2:
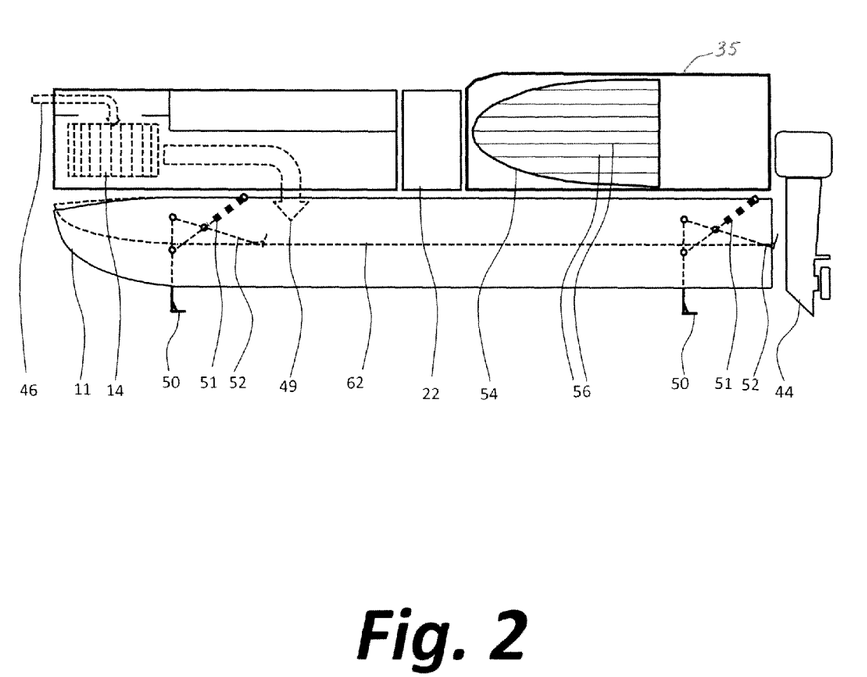
FIG. 2 is a side view of the craft showing the pontoons retracted for pontoon mode and a dashed line showing the center half pontoon that houses the plumbing for hydraulics to the squirrel cage lift fans located in the front of the craft, as well as the air flow. The side inlet design for the propulsion fans and deck access doors are shown. Landing gear for loading and unloading onto a cradle type pontoon trailer are shown attached to the center section of the craft.

FIG. 2 is a side view of the hovercraft 8 showing the pontoons 11 retracted for pontoon boat mode. A dashed line shows the center half pontoon 62 that houses the plumbing for hydraulics controlling the lift fans 14 allocated in the front of the craft 8. The air flow 46 into the lift fans 14 and from the lift fans 14 is shown. The housing 35 for propulsion fans 36 each have a side duct 54. The outdrive unit 44 is shown at the rear of the hovercraft 8. Landing gears 50 for loading and unloading the hovercraft 8 onto a cradle type pontoon trailer are shown attached to a middle section of the craft.

Figure 3:
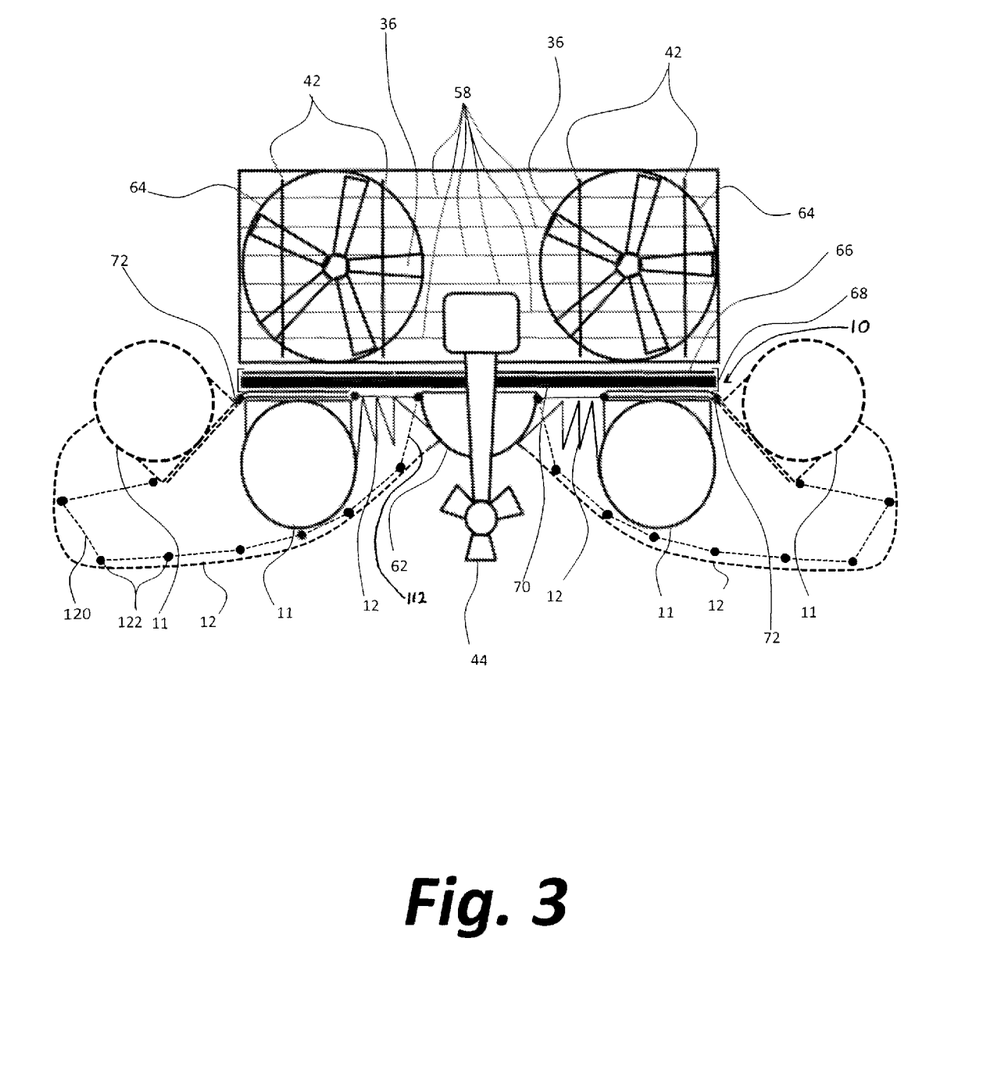
FIG. 3 is a rear view of the craft showing the two propulsion ducted fans located behind a set of horizontal guard members. Four rudders are located between the fans and horizontal guard members. This figure shows the two and a half tube design and the retracted skirt. The dashed lines show the pontoons that are rotated substantially 135 degrees, the deployed skirt in hovercraft mode, and the skirt retraction cable.

FIG. 3 is a rear view of the craft 8 showing the outdrive unit 44 and the two propulsion fans 36, the fans 36 located behind a set of horizontal spaced guard members 58. Rudders 42 are pivotally located between the fans 36 and horizontal guard members 58. FIG. 3 shows the two pontoons 11 in a retracted position corresponding to a pontoon boat mode. Dashed lines show the pontoons 11 rotated substantially 135 degrees in a hovercraft deployed position. The skirt 12 is also shown in dashed lines in a deployed position corresponding to the hovercraft mode. A skirt retraction system 112 is shown for retracting the skirt 12 when the hovercraft 8 is in pontoon boat mode.

Figure 4:
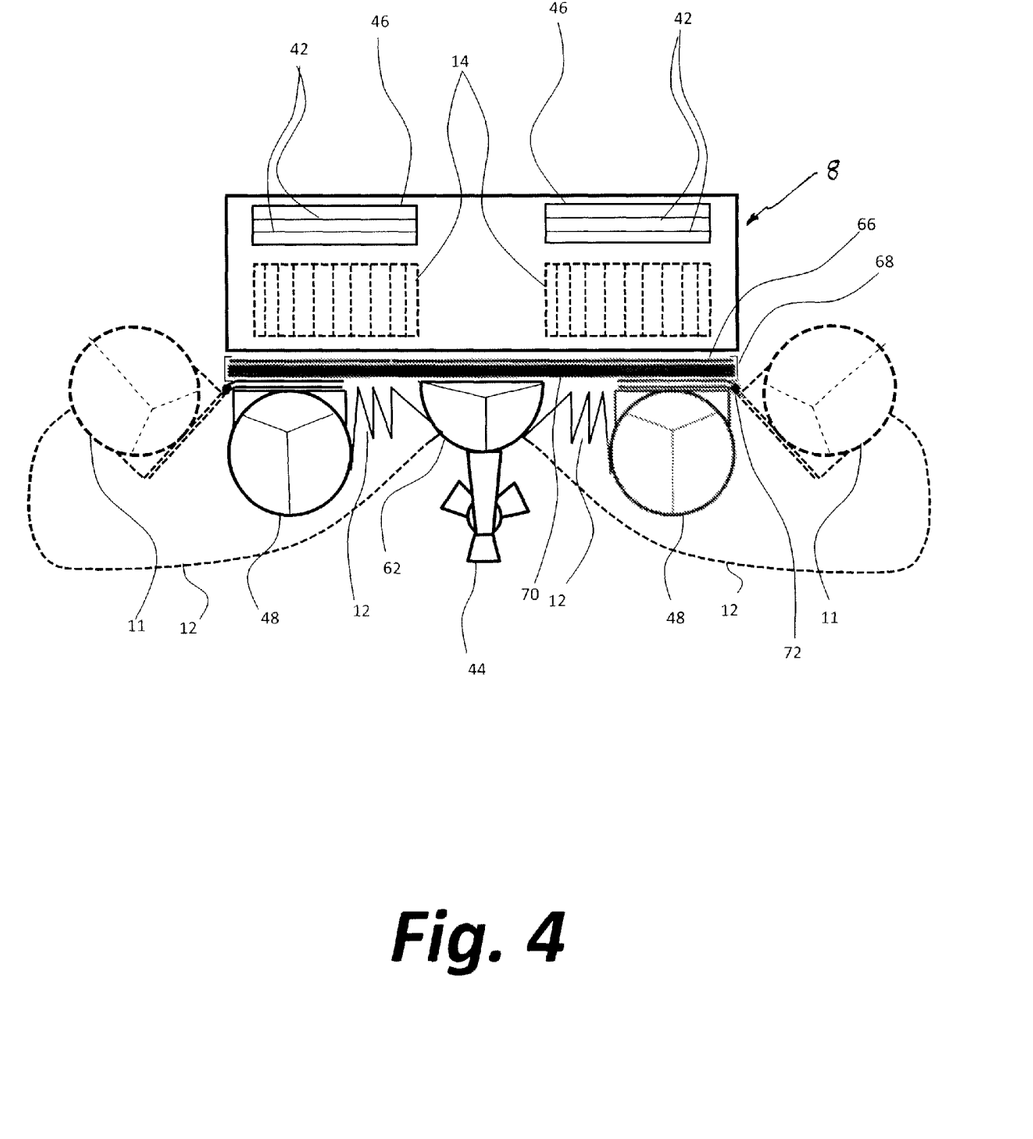
FIG. 4 is a front view of the craft showing the internal placement of the squirrel cage lift fans and the front air inlets with horizontal guard members. As in FIG. 3, the dashed lines represent the pontoons deployed at substantially 135 degrees in hovercraft mode.

FIG. 4 is a front view of the craft 8 showing the internal placement of the lift fans 14, each with front air inlets 46 and horizontal spaced guard members 42. Also shown is the outdrive unit 44 and the two pontoons 11 in a retracted position corresponding to the pontoon boat mode. The dashed lines show the pontoons 11 rotated substantially 135 degrees in a deployed position. The skirt 12 is shown in dashed lines in a deployed position corresponding to a hovercraft mode. A skirt retraction cable 120 (FIG. 3) retracts the skirt 12 when the hovercraft 8 is in pontoon boat mode.

Figure 5:
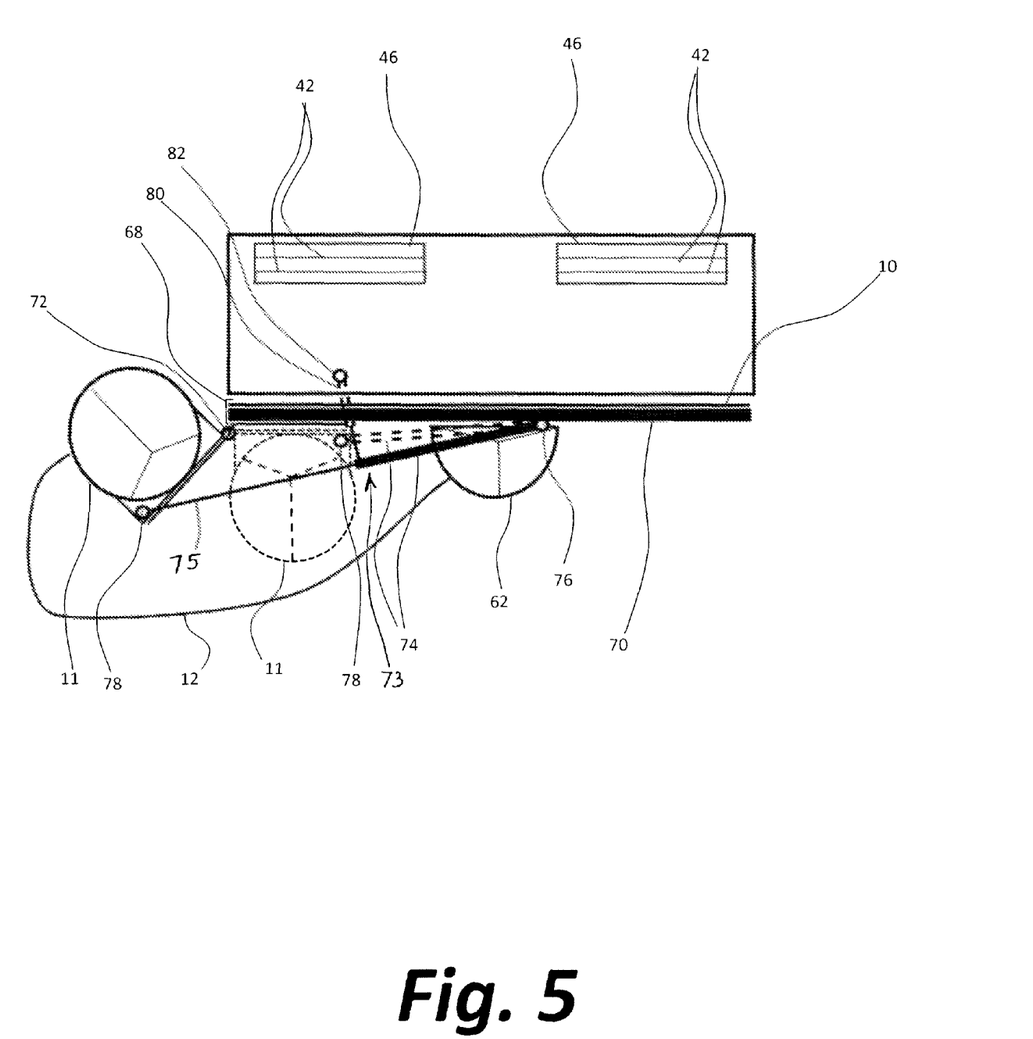
FIG. 5 shows the dual hydraulic ram system for deploying the pontoons at substantially 135 degrees. Here the dashed lines and hydraulic ram are shown in pontoon mode. A plurality of dual ram systems are used, depending on the length of the craft.

FIG. 5 shows one of the identical dual hydraulic ram systems 73 for rotating each pontoon 11 from a pontoon mode to a hovercraft mode and back. Each hydraulic ram system 73 comprises a first cylinder 74 and axially moveable piston 75, the piston 75, contacting a first point 78 on the pontoon 11. The cylinder 74 is pivotally connected at point 76 to the frame 10. The pontoon 11 is free to rotate about a hinge 72 at a second point on the pontoon 11 and the frame 10. A second cylinder and piston assembly 80 is attached to the frame 10, the second piston of assembly 80 pivotally connected to the first cylinder 74 to retract the first cylinder 74 toward the frame 10 to assist in rotating each pontoon 11 to its desired outward position. Here the dashed lines show the position of the hydraulic ram system 73 and the pontoon 11 while in pontoon mode. Multiple dual ram systems can be used along the length of the frame 10, if desired, depending on the length of the craft.

Figure 6:
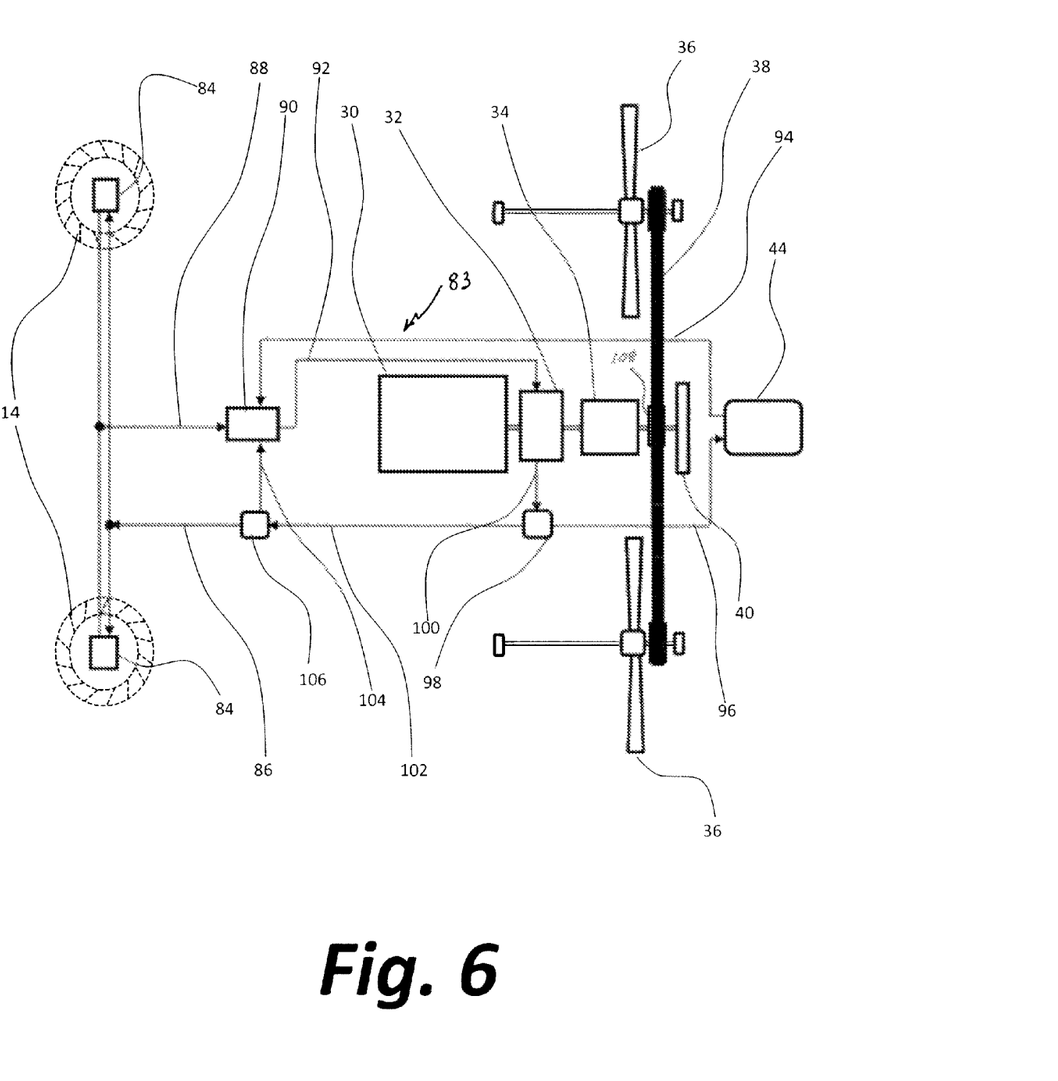
FIG. 6 is a mechanical schematic of the hydraulics used for the lift fans and outboard with associated valves and pressure regulator. The motor, lift pump, propulsion transmission, drive belt, and forward/reverse fan brake are also shown.

FIG. 6 is a mechanical schematic of the hydraulic system 83 used for the lift fans 14 and outdrive unit 44. Power for the hovercraft 8 comes from a motor 30 that directly drives a hydraulic pump 32 that provides operating pressure to the two lift fan motors 84 when in hovercraft mode, or to the hydraulic outdrive motor 44 when in pontoon boat mode. Switching hydraulic power between the lift fan motors 84 via pressure line 86 and the outdrive motor 44 via pressure line 96 is accomplished via mode valve 98 that is fed from pressure line 100 connected to the output of hydraulic pump 32. The speed of the lift fan hydraulic motors 84, which are fed from pressure line 86 at the output of the hydraulic pressure regulator 106 fed from pressure line 102, are limited to a low fixed speed. The bypass hydraulic fluid from regulator 106 returns to the reservoir 90 via the return line 104. Return line 94 from outdrive motor 44 feeds to the reservoir 90. The hydraulic fluid is fed from the reservoir 90 to the hydraulic pump 32 via a feed line 92. Return line 88 from lift fan motors 84 feeds into the reservoir 90. Coupled to the hydraulic pump 32 is the forward/reverse transmission 34 which supplies power to the propulsion fans 36 via a drive pulley 108 with a drive belt 38.

Figure 7:
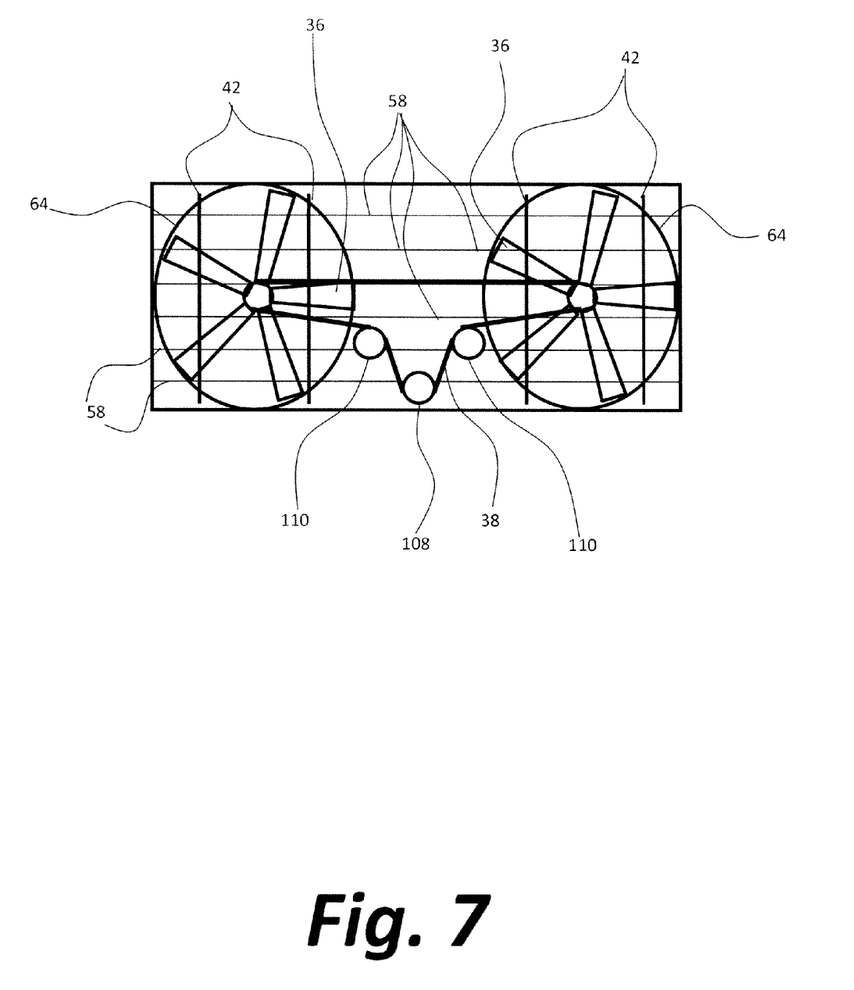
FIG. 7 shows the fan drive belt, idler pulleys and main drive pulley.

FIG. 7 shows the drive system for the propulsion fans 36. Power to the fans 36 is supplied by drive pulley 108 with drive belt 38. Tension on the drive belt 38 is provided by idler pulleys 110. Also shown are the horizontal guard members 58 and rudders 42 located between the fans 36 and horizontal guard members 58.

Figure 8:
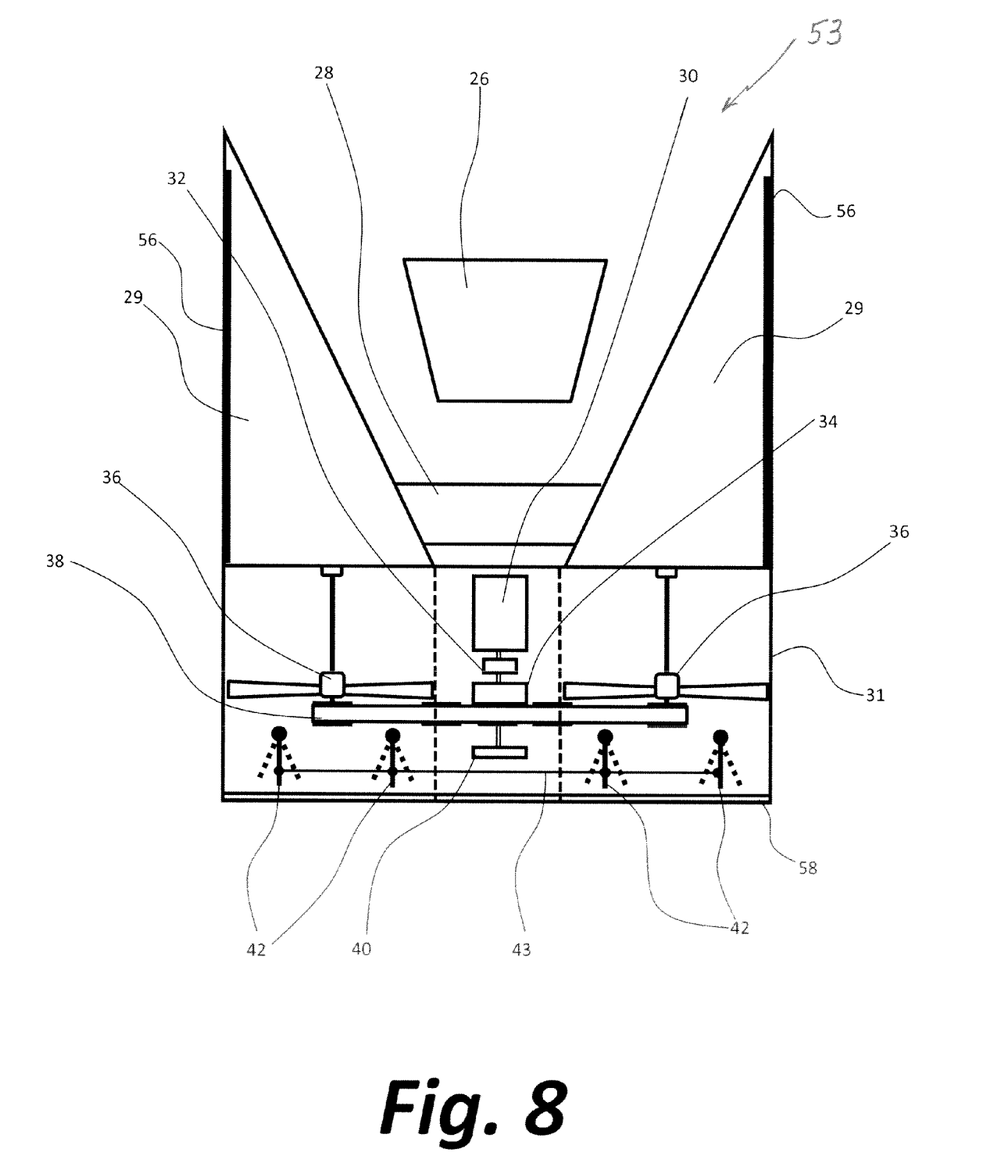
FIG. 8 is a diagram of the bolt-on ducted fan module with side inlets, dual ducted fans, four rudders, protective horizontal inlet/exhaust guard members, and the location of the motor/pump/transmission.

FIG. 8 is a diagram of the ducted fan module 53. The module 53 has wide side inlets 54 (FIG. 2), dual propulsion fans 36, rudders 42, and protective horizontal inlet/exhaust guard members 58 (FIG. 7). The propulsion side inlets 54 are mounted on the sides of the hovercraft 8 and are protected with horizontal bars 56 appropriately spaced to avoid ingestion of foreign matter. The propulsion fans 36 have circular ducts 64 (FIG. 7) to increase power and to contain any fan parts in case of breakage. The rudders 42 are protected behind the horizontal bars 58 that also provide protection from foreign matter when the propulsion fans 36 are in reverse. A brake 40 is provided that stops the propulsion fans 36 when transitioning from forward to reverse and from reverse to forward.

Figure 9:
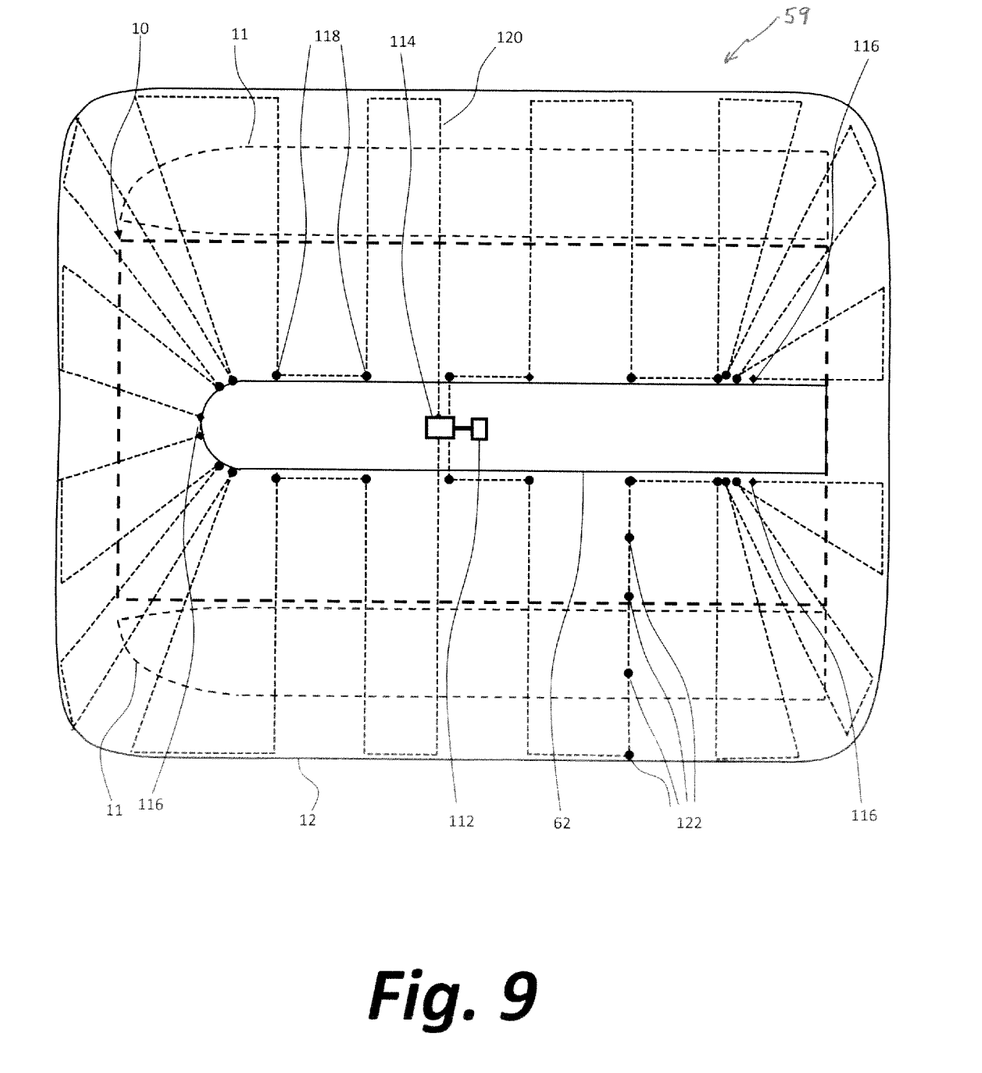
FIG. 9 is a diagram of the skirt retraction system that uses an electric winch and cables threaded through eyelets in the skirt and fixed to the center half tube.

FIG. 9 is a top view diagram of the skirt retraction system 112. The retraction system 112 uses an electric winch 114 and cables 120 threaded through eyelets 116, 118, and 122 in the skirt 12 and through pulleys (not shown) fixed to the center half pontoon 62.

The Hovertoon craft 8 shown in the accompanying drawings is a versatile craft for year round use on water, ice, or land for recreational, emergency, or freight hauling applications. As seen in FIG. 3, the craft 8 is comprised of a standard pontoon frame 10 utilizing aluminum cross members 70, a carpeted plywood deck 66, and trimmed with U-channels 68. On the front of the craft 8, dual squirrel cage lift fans 14 (FIG. 1) are mounted to provide the airflow 46 (FIG. 2) necessary to inflate the retracted skirt 12 when the pontoons 11 are in the hovercraft mode. In this mode, the pontoons 11 are rotated substantially 135 degrees outward from pontoon mode to hovercraft mode via the dual hydraulic ram system 73 (FIGS. 3-5).

Standard canvas Bimini tops can be used to cover various parts of the deck 66 of craft 8 since the design is based on lift fans 14, air inlets 46 and side propulsion fan 36 inlets and outlets 56.

The skirt 12 is retracted when transferring to the pontoon boat mode via the skirt retraction system 112 (FIG. 9). Cable 120 is wound onto a spool of the electric winch 114. Further, the cable 120 is threaded through eyelets 116, 118, and 122 that are sewn into the seam of the skirt 12 such that air cannot pass through the skirt 12. The electric winch 114 powers the spool that retracts the cable 120 and skirt 12 via a system of pulleys (not shown) mounted to the center half pontoon 62, the top inside of pontoons 11 and the bottom of the frame 10 the retracted skirt 12 is illustrated in FIGS. 3 and 4. To deploy the skirt 12, the skirt 12 is inflated via the lift fans 14 at the same time the electric winch 114 unwinds the cable 120 from the spool.

In the illustrated embodiment, the deck 66 of craft 8 has a lounge seat 18 and back rest 16. Access to the craft 8 is via dual doors 22 on the side of the craft 8. The pilot console 26 contains the instruments and steering controls. The driver's seat 28 is integrated into the power assembly 31.

There are two sets of hydraulic landing gear 50 (FIG. 2) that are used for loading and unloading the craft 8 from a standard cradle type pontoon trailer while on dry land. When on dry land, unloading of the craft 8 is accomplished by winching the craft backwards until the rear landing gear 50 is fully extended and then winched further until the front landing gear 50 is extended. The cradle pontoon trailer can then be driven away.

The two main pontoons 11 which are not touching the ground can be extended via actuation of pontoon extension hydraulic ram system 73 (FIG. 5). Once the pontoons 11 are in hover mode, power is applied to the lift fans 14 to elevate the craft 8 with the skirt 12 deployed, at which time the front and rear landing gear 50 can be retracted using piston and cylinder assembly 51 (FIG. 2). When backing the craft 8 into the water in pontoon boat mode, the hydraulic outdrive unit 44 extends into the water and is used to back the craft off the trailer. The craft 8 is used as a pontoon boat. To initiate operation of the craft 8 in hover mode, mode valve 98 is shifted to hover mode to power the lift fans motors 84 and to hover the craft 8 on the water. Once hovering, power can be applied to the propulsion fans 36 for lateral propulsion of the craft.

When loading the craft 8 on a cradle trailer from water, the pontoons 11 will need to be in pontoon boat mode, and the craft 8 can either be winched onto the trailer or the hydraulic outdrive unit 44 can be used to push the craft onto the trailer. If the craft 8 is driven onto land, the landing gear 50 are deployed vertically downward, the lift fans 14 disengaged, and deployed pontoons 11 retracted to pontoon boat position. The trailer is then backed under the craft 8. When the front of the pontoons 11 are on the cradle, the front landing gear 50 is retracted and the trailer pulled up to the rear landing gear 50, at which time the rear landing gear 50 is retracted and the craft 8 winched the remainder of the way onto the trailer.

What is claimed:

1. A combination floating pontoon boat and air-cushion supported hovercraft, comprising:
    a frame;
    a plurality of pontoons pivotally and retractably mounted to the frame, the plurality of pontoons having a first position extending downward from the frame and a second position extending substantially laterally outward from said frame;
    a skirt attached to and extending from the frame, the skirt in a first position being retracted against a bottom of the frame, the skirt in a second position extending downward from the frame and forming an air-receiving pocket beneath the bottom of the frame;
    a first power system adapted to move the frame through water when the plurality of pontoons are in said first position;
    a second power system adapted to drive air into the air-receiving pocket when the skirt is in said second position; and
    a third power system adapted to propel the frame in a longitudinal direction when air is driven into said air-receiving pocket.

2. The combination floating pontoon boat and air-cushion supported hovercraft of claim 1, wherein:
    each of said plurality of pontoons are controllably pivotally mounted to a bottom of the frame.

3. The combination floating pontoon boat and air-cushion supported hovercraft of claim 1, wherein: the second pontoon position is rotated substantially 135 degrees from the first pontoon position.

4. The combination floating pontoon boat and air-cushion supported hovercraft of claim 1, further comprising:
    a plurality of landing gears rotatably extending below the frame, the plurality of landing gears adapted for loading and unloading the hovercraft onto and from a trailer.

5. The combination floating pontoon boat and air-cushion supported hovercraft of claim 1, comprising:
    a controllable deploying and retracting system moving the skirt between the first and second position of the skirt.

6. The combination floating pontoon boat and air-cushion supported hovercraft of claim 5, wherein:
    the deploying and retracting system is a powered cable reel, and a cable system operatively connected to said skirt.

7. A combination floating pontoon boat and air-cushion supported hovercraft, comprising:
    a frame having a bottom;
    a plurality of pontoons pivotally and retractably mounted to the frame, the plurality of pontoons having a first pontoon position extending downward from the frame and a second pontoon position extending substantially laterally outward from said frame;
    a pivoting mechanism extending between said frame and each of said plurality of pontoons, said pivoting mechanism pivoting the plurality of pontoons between the first and second pontoon positions;
    a skirt attached to and extending from the frame, the skirt having a first skirt position being retracted against the bottom of the frame, the skirt having a second skirt position extending downward from the frame and forming an air-receiving pocket beneath the bottom of the frame;
    a deploying and retracting mechanism operatively connected to the skirt and the frame, said mechanism moving the skirt between the first and second skirt positions;
    a first power system adapted to move the frame through water when the plurality of pontoons are in the first pontoon position;
    a second power system adapted to drive air into the air-receiving pocket when the skirt is in the second skirt position, and said pontoons are in said second pontoon position, the second power system adapted to vertically lift the frame in a longitudinal direction when air is driven into said air-receiving pocket; and
    a third power system adapted to laterally move the frame through water when the plurality of pontoons are in the second pontoon position and the skirt is in the second skirt position.

8. The combination floating pontoon boat and air-cushion supported hovercraft of claim 7, wherein:
    the plurality of pontoons independently pivotable and retractable.

9. The combination floating pontoon boat and air-cushion supported hovercraft of claim 7, wherein:
    portions of said skirt attached to each pontoon, deployment of said pontoons to said second pontoon position simultaneously deploying said skirt to said second skirt position.

10. The combination floating pontoon boat and air-cushion supported hovercraft of claim 7, wherein:
    the deploying and retracting mechanism is a powered cable reel operatively connected to a cable, the cable operatively connected to said skirt.

11. The combination floating pontoon boat and air-cushion supported hovercraft of claim 7, wherein:

the second pontoon position is rotated substantially 135 degrees from the first pontoon position.

12. The combination floating pontoon boat and air-cushion supported hovercraft of claim 7, further comprising:
a plurality of landing gear rotatably extending below the frame said plurality of landing gear adapted for loading and unloading the hovercraft onto a trailer.

* * * * *